United States Patent

[11] 3,540,691

[72] Inventor Arthur H. Snell, Jr.
 5843 Paisley, Houston, Texas 77035
[21] Appl. No. 801,481
[22] Filed Feb. 24, 1969
[45] Patented Nov. 17, 1970

[54] BODY AND SEAT CONSTRUCTION FOR BUTTERFLY VALVES
 6 Claims, 6 Drawing Figs.
[52] U.S. Cl.................................................... 251/151, 251/306
[51] Int. Cl..................................................... F16k 1/226
[50] Field of Search........................................... 251/148, 151, 306; 137/454.2, 375

[56] References Cited
UNITED STATES PATENTS

| | | | |
|---|---|---|---|
| 2,740,423 | 4/1956 | Stillwagon | 137/454.2 |
| 2,809,060 | 10/1957 | Thompson | 251/306X |
| 3,241,806 | 3/1966 | Snell | 251/148 |
| 3,314,641 | 4/1967 | Overbaugh | 251/148 |
| 3,346,005 | 10/1967 | Hanssen | 251/148X |

Primary Examiner—William R. Cline
Attorney—R. Werlin

ABSTRACT: A body and seat construction for butterfly valves in which the wall of the flow passage through the valve casing and the seat assembly installed therein have complementary spherical surfaces whereby to prevent axial movement of the seat assembly relative to the casing.

Patented Nov. 17, 1970
3,540,691
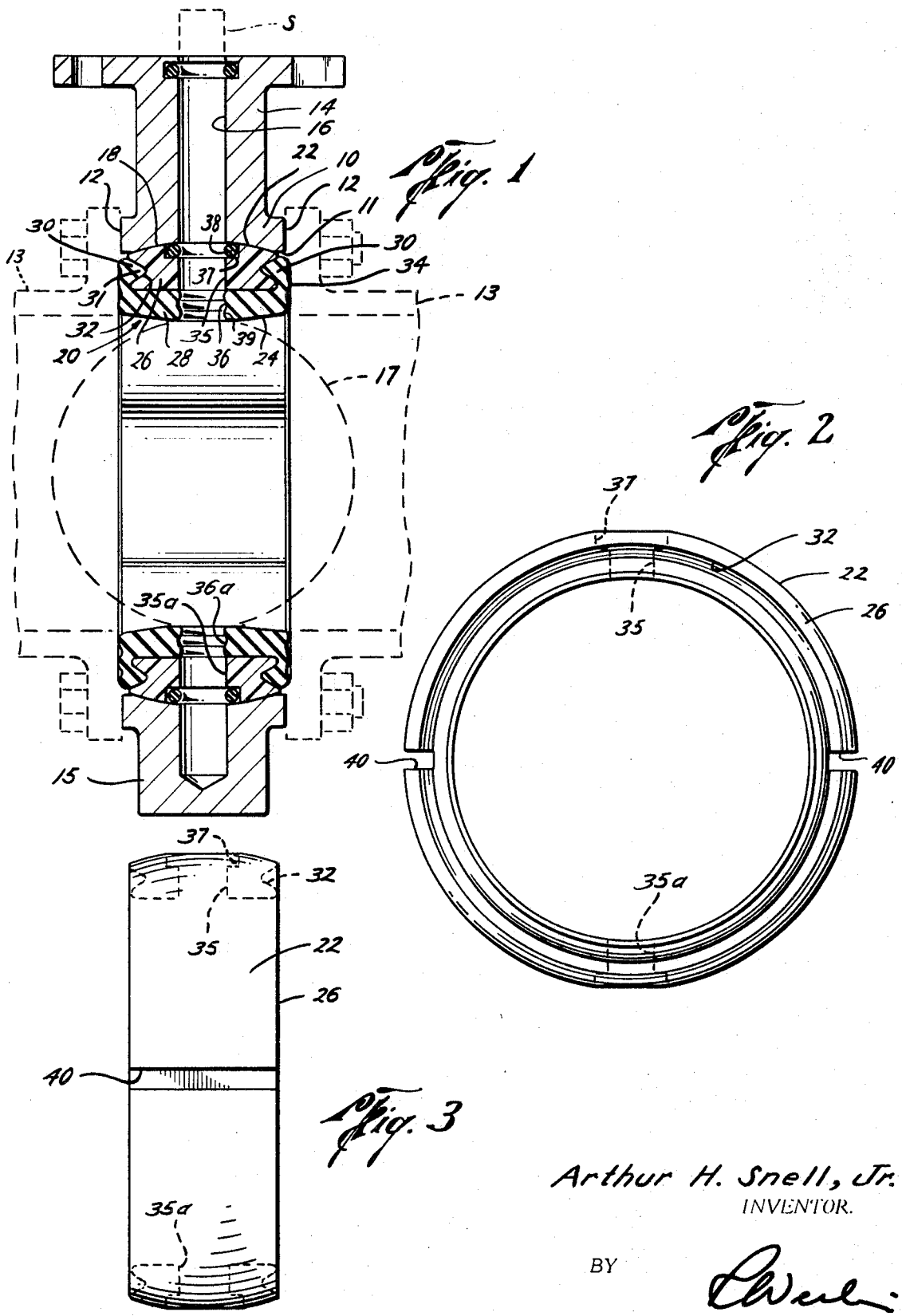
Arthur H. Snell, Jr.
INVENTOR.
BY
ATTORNEY

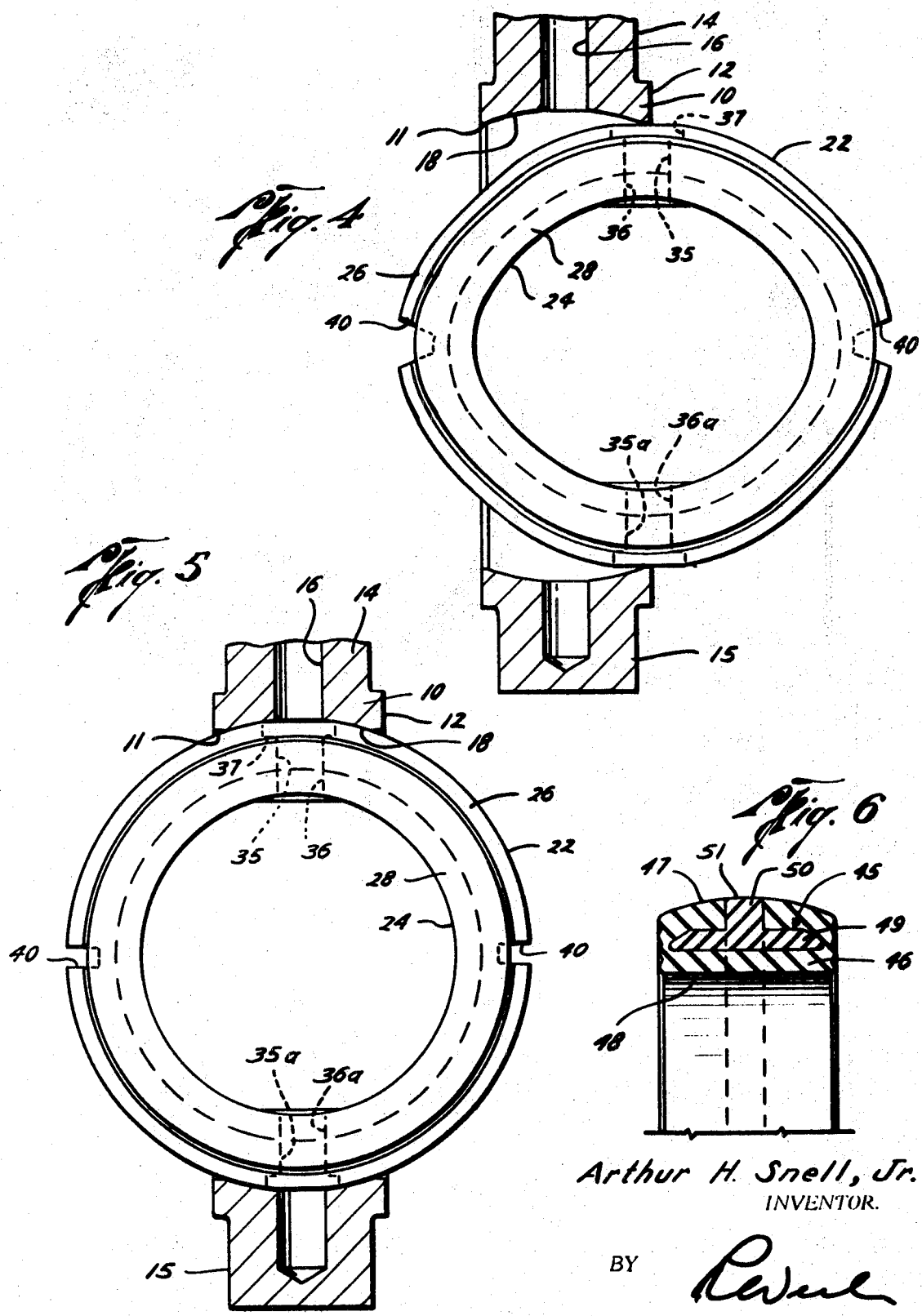

BODY AND SEAT CONSTRUCTION FOR BUTTERFLY VALVES

Conventional butterfly valves ordinarily comprise an annular casing adapted to be clamped between flange fittings and having a cylindrical flow passage therethrough in which is seated an annular seat assembly for engagement by the valve disk which is rotatably mounted in the casing to seal with the inner wall of the seat assembly. The latter may be composed entirely of resilient material or some combination of softer and harder materials, the latter being usually in the form of a back-up insert, which combination functions to provide a fluid-tight seal with the disk when the latter is in the closed position. Also, the seat assembly will frequently be made slightly longer than the valve body so as to project slightly on each side in order that these projections will function as gaskets when the valve casing is clamped between the usual flanged fittings.

Since the bore of the valve casing and the external surface of the seat assembly are conventionally cylindrical, there is a tendency of the seat assembly to be displaced axially if one of the flange fittings is removed or loosened when the valve is in the closed position, and thus prevents removal of one of the fittings when the valve is closed and under pressure in some circumstances where this may be desirable.

The present invention, therefore, is directed to an improved valve body and seat assembly construction which possesses all of the desirable characteristics of the more conventional constructions but which in addition, provides a structure in which the seat assembly will be immovable axially of the valve casing when a flange is removed while the valve is in the closed position.

In accordance with this invention, the desirable result is obtained by forming the bore wall of the casing as a concave spherical surface and the external periphery of the seat assembly to a complementary convex spherical shape. As a result, when the seat assembly provided by the present invention having the spherical periphery is installed in a casing having a matching spherical surface in its bore wall, the engaged surfaces will fit together so closely as to prevent any axial movement of the seat assembly when the valve is in the closed position and the downstream flange fitting, for example, is removed or loosened.

A further object of this invention is to provide a seat assembly of composite construction comprising an outer layer of relatively soft resilient material for sealing engagement by the valve disk, and an inserted back-up ring of nonmetallic material which is of deformable character but substantially harder than the external layer, whereby to provide a strong seat structure which, while deformable for effective sealing both with the valve disk and with the clamping flanges, will also have sufficient back-up support to prevent undue distortion of the assembly as a whole when under line pressure.

Other and more specific objects and advantages of this invention will become more readily apparent from the following detailed description when read in conjunction with the accompanying drawing which illustrates a useful embodiment in accordance with this invention and a modification thereof.

In the drawing:

FIG. 1 is a vertical, cross-sectional view of a valve body and seat assembly in accordance with this invention, showing in broken lines the clamping end flanges and the valve disk.

FIG. 2 is a side elevational view of the back-up ring employed in the seat assembly;

FIG. 3 is an edge elevational view of the back-up ring;

FIGS. 4 and 5 are views illustrating stages in the installation of the seat assembly in the valve casing; and FIG. 6 is a fragmentary sectional view of a modification of the seat assembly.

Referring to the drawing, the valve comprises the annular casing 10 having an axial bore 11 constituting the flow passage through the valve. The body is formed with spaced-apart parallel end faces 12-12 which are adapted to be clamped between flanged fittings 13-13 by which the valve is connected to a flow line or the like. Body 10 has diametrically opposed radial extensions 14 and 15 through which a transverse bore 16 extends and is adapted to receive a stem, indicated at 14, for rotating the butterfly or valve disk 17, shown in broken lines in the open position in FIG. 1. Bore 16 is disposed centrally between end faces 12-12 of the valve casing and its longitudinal axis intersects the longitudinal axis of the flow passage through the casing. The wall 18 of flow passage 11 is formed to a concave shape defined by a sector of a sphere whose center is at the intersection of the axes of bores 16 and flow passage 11.

A seat assembly, designated generally by the numeral 20, is constructed for seating in wall 18 of the flow passage. Seat assembly 20 is a composite structure having a cross section shape defined by an external peripheral surface 22 having a convex spherical shape complementary to that of wall 18, and an internal surface 24 of generally convex shape symmetrical about the axis of bore 16. The composite structure comprising the seat assembly includes a back-up ring 26 constructed of a nonmetallic relatively hard, but deformable, material which is inserted in and molded to an external layer 28 of a relatively softer, more flexible, and more deformable material which defines inner face 24 of the seat assembly and which has outwardly extending annular flanges 30-30 on each side. The latter have inwardly extending tongues 31 receivable in correspondingly shaped grooves 32 in the side edges of back-up ring 26 to anchor the outer or sealing layer to the back-up ring in the molding of the assembly. The overall length of the seat assembly, the ends of which are defined by flanges 30, is made slightly greater than the length of casing 10, so as to project slightly beyond end faces 12. The outer surfaces of flanges 30 are formed with serrations or lips 34 which are adapted, when clampingly engaged by fittings 13, to be compressed and form sealing gaskets between the valve casing and the flanged fittings.

Back-up ring 26 and sealing layer 28 are provided with bores 35, 35a, 36, and 36a, respectively, which register with the sections of bore 16 in extensions 14 and 15 for accommodation of the related sections of the operating stem connected to the valve disk. Back-up ring 26 is provided in its outer surface surrounding bore 36 with an annular recess 37 to receive an O-ring 38 or similar seal for sealing about the stem which extends through bore 16. Bore 36 of the outer sealing layer may be provided with inwardly projecting lips 39 to sealingly engage about the stem section passing therethrough. Similar sealing features are provided in the seat assembly for sealing about a lower stem extension which projects into body extension 15.

To install the seat assembly in the valve casing, the seat assembly is deformed by pressure exerted across the ends of the stem bore through the seat assembly so as to compress it to an elliptical shape, as best seen in FIG. 4, to enable the assembly to be inserted into flow passage 11 parallel to the axis of the flow passage. When the seat assembly has been thus moved through the flow passage in the valve casing to a point at which the center of the assembly is in registration with the axis of the stem bore, as seen in FIG. 5, the spherical surface 22, defined by the exterior of the seat assembly, and the spherical surface defined by the wall 18 of the casing, will have the relation of a ball joint so that it is only necessary to rotate the seat assembly to 90° to place it in alignment with the valve casing, as seen in FIG. 1.

In order to assure the ability of the seat assembly to be compressed or deformed, as illustrated in FIG. 4, back-up ring 26 is provided with notches 40, or other weakened sections, at diametrically opposite points angularly spaced from the stem axis through the assembly. This is desirable because ordinarily back-up ring 26, while made of nonmetallic material and slightly deformable, should be made as hard as consistent with assuring tight nonmovable engagement with surface 18 of the flow passage.

When the seat assembly is in place in the valve casing, as seen in FIG. 1, it will be evident that by reason of the spherical surfaces of the seat assembly and wall of the flow passage, the seat assembly will be effectively immovable axially of the flow passage whether or not it is supported by the flanged end fittings.

FIG. 6 illustrates a modification of a seat assembly in accordance with this invention, in which the back-up ring, designated generally by the numeral 45, is T-shaped in cross section and is fully embedded in the softer flexible layer 46, the latter defining both the external spherical surface 47 and the convex inner surface 48. The back-up ring comprises the cross arm 49 and the center leg 50, which extends outwardly of the cross arm and terminates in an end surface 51 shaped to form a part of the spherical exterior surface 47.

Outer layer 28 of the seat assembly will be constructed of generally conventional and well known elastomeric materials of suitable resilience to assure tight sealing with the butterfly disk, the end flanges and with casing wall surface 18. Back-up rings 26 and 45 will be constructed of relatively much harder nonmetallic material which possess the desired degrees of hardness and limited deformability. Such materials may include, as well known examples, hard rubbers and phenolic or other plastic materials.

It will be understood that various other alterations and modifications may be made in the details of the illustrative embodiment within the scope of the appended claims but without departing from the spirit of this invention.

I claim:

1. Body and seat construction for butterfly valves, comprising:
   a. an annular casing having parallel opposite end faces adapted to be clamped between flanged fittings;
   b. a flow passage through the casing interconnecting said end faces;
   c. a transverse stem bore intersecting said flow passage centrally of said casing between said end faces;
   d. the wall of said passage having a concave spherical surface defined by a sector of a sphere having its center at the intersection of the axes of said flow passage and said stem bore; and
   e. a seat assembly coaxially seatable in said passage comprising an annular body of deformable material having a convex outer surface of spherical shape complementing that of said spherical surface, and having a length to project symmetrically slightly beyond both said end faces when said assembly is seated in said passage for clamping engagement by said fittings.

2. The invention according to claim 1 wherein said seat assembly is of composite nonmetallic material comprising:
   a. an outer layer of relatively soft, elastomeric material; and
   b. an annular insert of relatively harder material strongly resistant to transverse deformation molded to said outer layer and having its outer periphery structurally weakened at diametrically opposite points.

3. The invention according to claim 2 wherein said seat assembly includes:
   a. coaxial transverse bore section adapted to register with the stem bore in said casing; and
   b. annular packing recesses in the exterior surface of the assembly surrounding said bore sections.

4. The invention according to claim 3 wherein the portions of said bore sections extending through said outer layer are provided with internally projecting sealing lips for sealing about the operating stem.

5. The invention according to claim 2 wherein said insert is T-shaped in cross section having its center leg extending to said exterior surface.

6. The invention according to claim 1 wherein said outer layer extends over the inner peripheral surface of the assembly and has integral flange portions extending over the side edges of said insert, said flange portions having concentric sealing lips on their outer faces adapted for compressive sealing engagement with flanged fittings clamping the casing.